US012711219B2

(12) United States Patent
Thandavarayan et al.

(10) Patent No.: US 12,711,219 B2
(45) Date of Patent: Aug. 18, 2026

(54) AUTOMATING USER-SPECIFIC PERFORMANCE CUSTOMIZATION IN SOFTWARE CONTROLLED ACROSS MULTIPLE DEVICES

(71) Applicant: Truist Bank, Charlotte, NC (US)

(72) Inventors: Ganesh Kumar Thandavarayan, Apex, NC (US); Raghavendra P. Narasimhan, Cary, NC (US)

(73) Assignee: TRUIST BANK, Charlotte, NC (US)

( * ) Notice: Subject to any disclaimer, the term of this patent is extended or adjusted under 35 U.S.C. 154(b) by 42 days.

(21) Appl. No.: 19/007,615

(22) Filed: Jan. 2, 2025

(65) Prior Publication Data

US 2026/0187222 A1 Jul. 2, 2026

(51) Int. Cl.
*H04L 29/06* (2006.01)
*G06F 21/31* (2013.01)
*G06F 21/44* (2013.01)

(52) U.S. Cl.
CPC .............. *G06F 21/44* (2013.01); *G06F 21/31* (2013.01)

(58) Field of Classification Search
CPC ..... G06F 21/44; G06F 21/31; H04L 63/0892; H04L 63/08; H04L 63/0263; H04L 63/20
See application file for complete search history.

(56) References Cited

U.S. PATENT DOCUMENTS 9,185,175 B1 * 11/2015 Sharma ................. H04L 67/306
9,762,566 B2 * 9/2017 Sheller .................... G06F 21/31
2012/0089875 A1 * 4/2012 Faust ................. G06F 11/3688 726/19
2017/0078879 A1 * 3/2017 da Cruz Pinto ........ H04L 63/10

* cited by examiner

*Primary Examiner* — Longbit Chai
(74) *Attorney, Agent, or Firm* — Michael A. Springs, Esq.; Shumaker, Loop & Kendrick, LLP; Patrick B. Horne

(57) ABSTRACT

A system automates user-specific performance customization in software controlled across multiple devices by conducting current user sessions in which programs are run and user interfaces are displayed at least in part controlled by user-specific program-specific configuration files. The system receives user commands across a network connection from user devices. The user commands include runtime instructions for the specific running programs for which actions are performed accordingly. The system automatically updating user-specific historical data according to received user requests and/or received user commands. Upon initiating a subsequent user session of any specific user, performance attributes of that user session are controlled according at least in part to the updated user-specific historical data in the user-specific profile.

17 Claims, 8 Drawing Sheets

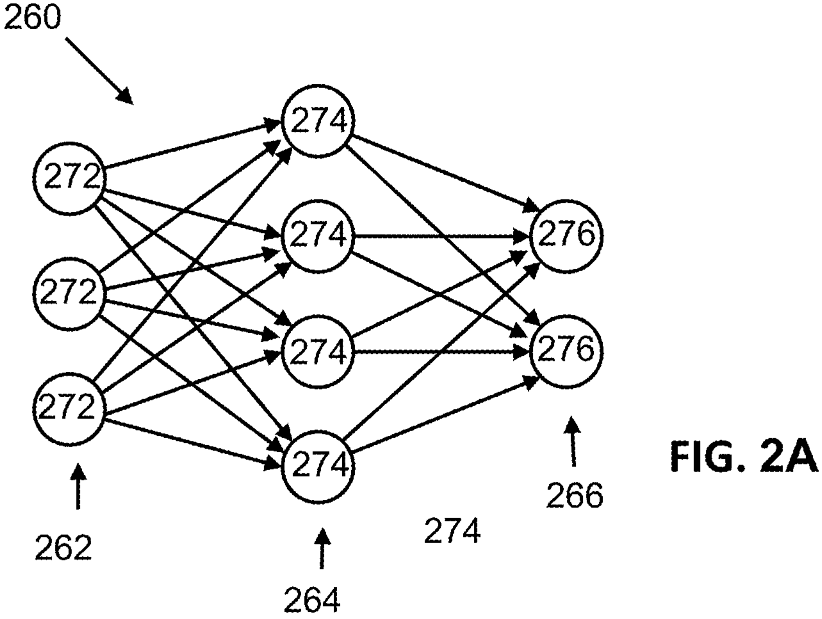
FIG. 2A
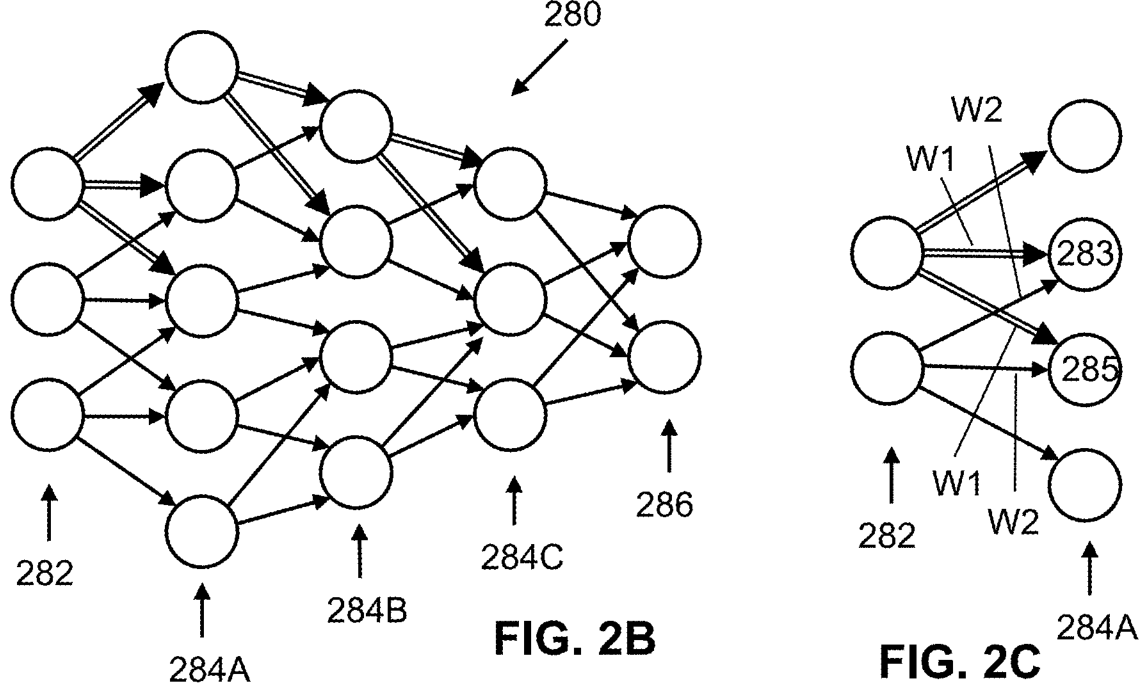
FIG. 2B
FIG. 2C

AUTOMATING USER-SPECIFIC PERFORMANCE CUSTOMIZATION IN SOFTWARE CONTROLLED ACROSS MULTIPLE DEVICES

TECHNICAL FIELD

The present disclosure relates to implementing performance flexibility in distributed computing environments. More particularly, the present disclosure relates to automating user-specific performance customization in software controlled across multiple devices.

BACKGROUND

Commercial entities and other user groups expect flexibility in how shared software performs at an end-user device. Remote work is increasingly popular. Workers in many professions are using software applications to conduct work online and access services and resources for their employers and for their personal use.

Users crave personalized experiences when engaging with applications and other programs. They expect tailored and flexible customizations that cater to their unique preferences and requirements. Workers and consumers alike tend to customize user interfaces. People can typically accomplish tasks most efficiently using their own preferred and familiar display arrangements. Time can be lost by workers and consumers reconfiguring user interfaces each time applications and other programs are initiated or updated, and software is frequently updated. Work forces need transitions to flow as seamlessly as possible. Small efficiencies that could be gained by workers using familiar settings such as interface arrangements, and those setting and arrangements being easily regained at next use, even across updates, would be of higher cumulative value than ever before.

Improvements are needed in automating user-specific performance customization in software controlled across multiple devices.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

A system, and a method implemented thereby or therewith, each according to at least one embodiment, a system for automates user-specific performance customization in software controlled across multiple devices. The system includes: a computing system comprising at least one processor and at least one of a memory device and a non-transitory storage device, wherein said at least one processor executes computer-readable instructions; and a network connection for operatively connecting multiple user devices to the computing system. Upon execution of the computer-readable instructions, the computing system performs steps including, for each user device of the multiple user devices: receiving login credentials from a specific user device of the multiple user devices; confirming validity of the login credentials with respect to a specific user; and initiating and conducting a current user session via the specific user device The current user session includes the computing system reading a user-specific profile associated with the received login credentials and the specific user. The user-specific profile includes: a user-specific program list identifying one or more program available to the specific user; for each program of the one or more program identified in the user-specific program list, a user-specific program-specific configuration file; and user-specific historical data stored over time from multiple prior user sessions of the specific user. The steps performed by the computing system further include: controlling performance attributes of the current user session according at least in part to the user-specific historical data; receiving a user request from the specific user device, the user request including a request to run a specific program identified in the user-specific program list; authorizing running of the specific program thereby causing across the network connection displaying, by the specific user device, a user interface of the specific program at least in part controlled by the user-specific program-specific configuration file for the specific program; receiving user commands across the network connection from the specific user device, the user commands including runtime instructions for the specific program; performing actions, via the specific program, corresponding to the runtime instructions; automatically updating the user-specific historical data in the user-specific profile according to at least one of: the received user request; and the received user commands; and upon initiating a subsequent user session of the specific user, controlling performance attributes of the subsequent user session according at least in part to the updated user-specific historical data in the user-specific profile.

Controlling performance attributes of the current user session according at least in part to the user-specific historical data includes, in some examples, at least one of automatically establishing a display arrangement, automatically sizing a window, automatically positioning a window, and automatically displaying a background image in a window.

Controlling performance attributes of the current user session according at least in part to the user-specific historical data includes, in some examples, automatically setting a property on a form, automatically prepopulating at least one field, automatically set whether a form should automatically perform a query, automatically setting whether a form should open a query dialog, automatically setting whether a form should create a new record, and automatically setting or revising whether at least one field in a form should start empty when initiated.

Running of the specific program may include executing code stored separate from the user-specific program-specific configuration file for the specific program.

The running of the specific program may be adjustable by modification of the user-specific program-specific configuration file for the specific program without modifying the code.

The computing system, upon initiating and conducting the current user session via the specific user device, likely concurrently conducts multiple other user sessions for other users via other respective user devices.

Controlling performance attributes of the current user session according at least in part to the user-specific historical data may include using a controlling algorithm trained by a machine-learning technique.

The computing system may further train the controlling algorithm by the machine-learning technique, and the machine-leaning technique may include: ingesting user-specific historical data stored over time from multiple prior user sessions of each of multiple users; and in at least one iteration of multiple iterations: predicting subsequent user commands of at least some users of the multiple users based on the ingested historical data stored over time using a trained model based on weighted calculations; receiving across the network connection actual subsequent user commands from the at least some users via respective user devices; aggregating comparison data by comparing respectively the predicted subsequent user commands of the at least some users to the actual subsequent user commands from the at least some users; and updating, using the aggregated comparison data, weights of the weighted calculation for use in one or more other iterations following the at least one iteration, in which one or more other iterations further user commands of at least some users of the multiple users are predicted.

A system, according to some embodiments to which the above-described options and examples apply as well, automates user-specific performance customization in software controlled across multiple devices. The system includes: a computing system including at least one processor and at least one of a memory device and a non-transitory storage device. The at least one processor executes computer-readable instructions stored at least in part by the at least one of a memory device and a non-transitory storage device. A network connection for operatively connects multiple mobile user devices to the computing system. Upon execution of the computer-readable instructions, the computing system performs steps including, for each mobile user device of the multiple mobile user devices: receiving login credentials from a specific mobile user device of the multiple mobile user devices; confirming validity of the login credentials with respect to a specific user; initiating and conducting a current user session via the specific mobile user device, while concurrently conducting multiple other user sessions for other users via other respective mobile user devices. The current user session includes the computing system reading a user-specific profile associated with the received login credentials and the specific user. The user-specific profile includes: a user-specific program list identifying one or more program available to the specific user; for each program of the one or more program identified in the user-specific program list, a user-specific program-specific configuration file; and user-specific historical data stored over time from multiple prior user sessions of the specific user. The computing system performs further steps including: controlling performance attributes of the current user session according at least in part to the user-specific historical data using a controlling algorithm trained by a machine-learning technique; receiving a user request from the specific mobile user device, the user request including a request to run a specific program identified in the user-specific program list; authorizing running of the specific program thereby causing across the network connection displaying, by the specific mobile user device, a user interface of the specific program at least in part controlled by the user-specific program-specific configuration file for the specific program; receiving user commands across the network connection from the specific user mobile device, the user commands including runtime instructions for the specific program; performing actions, via the specific program, corresponding to the runtime instructions; automatically updating the user-specific historical data in the user-specific profile according to at least one of: the received user request; and the received user commands; and upon initiating a subsequent user session of the specific user, controlling performance attributes of the subsequent user session according at least in part to the updated user-specific historical data in the user-specific profile.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

FIG. 2A is a diagram of a feedforward network, according to at least one embodiment, utilized in machine learning FIG. 2B is a diagram of a convolutional neural network (CNN), according to at least one embodiment, utilized in machine learning.

FIG. 2C is a diagram of a portion of the convolutional neural network of FIG. 2B, according to at least one embodiment, illustrating assigned weights at connections or neurons.

DETAILED DESCRIPTIONS

Figure 1:
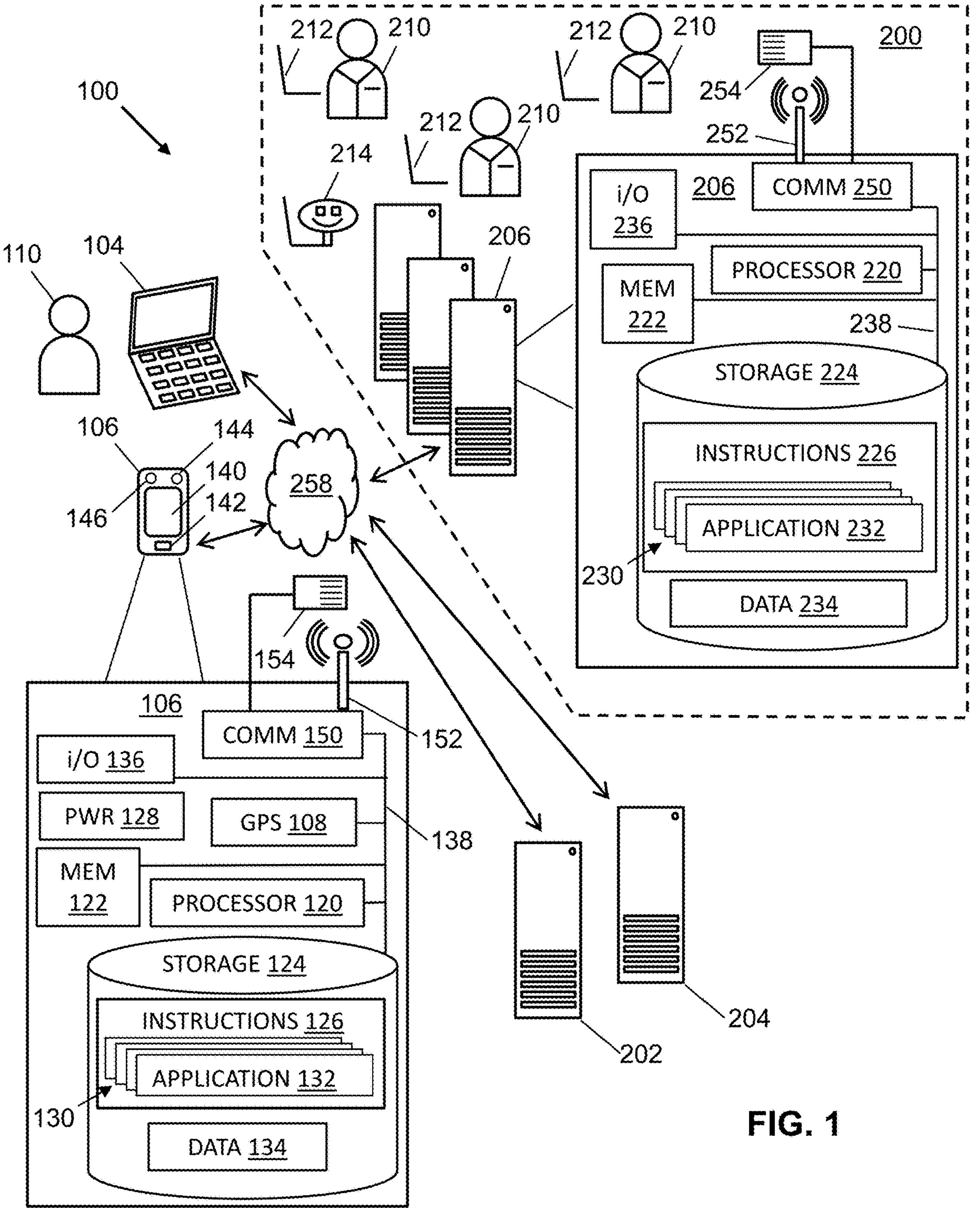
FIG. 1 illustrates an enterprise system, and environment thereof, according to at least one embodiment.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments. Like numbers refer to like elements throughout. Unless defined otherwise, technical and scientific terms used herein have the same meaning as commonly understood to one of ordinary skill in the art to which the presently disclosed subject matter pertains.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that some terms, and any form thereof, are open-ended, such as at least the terms comprise, include, contain. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts described, illustrated, and/or implied. Alternatively, computer program implemented steps or acts may be combined with operator or human implemented steps or acts in order to carry out an embodiment of the invention.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, and other data types.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, electrically connecting those components, either directly or indirectly by way of intermediate component(s), with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing.

Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated system 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third and fourth party systems such as merchant systems configured to interact with the user device 106 during transactions and also configured to interact with the enterprise system 200 in back-end transactions clearing processes.

In certain embodiments, one or more of the systems and devices, such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.'

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s). Worker profiles may be classified on various designations/classifiers such as assigned tasks and terms of employment. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

Systems and methods in various embodiments are provided to facilitate automating user-specific performance customization in software controlled across multiple devices. Configuration information contributes to determine a user application's behavior at run-time. The allows developers to make changes to an application's behavior simply by modifying the configuration files or configuration data rather than modifying the code of the user application. User-specific historical data stored over time from multiple prior user sessions of any specific user can be used to control, at least in part, performance attributes of any current user session. Received user requests, for example to access and run programs, and received user commands, for example including runtime instructions for a specific program, are used to update the user-specific historical data. User-specific historical data may be used by a controlling algorithm trained by a machine-learning technique, to predict user commands based on ingested historical data stored over time and using a trained model based on weighted calculations.

The entity, or first entity, can in various implementations be described as an enterprise entity, a business entity, a retailer, a merchant entity, a financial institution, a bank, or other service and/or product or service provider. As such, the first entity may maintain or have access to, user profiles and accounts. Questions for any given user in any given session can be tailored to their situation, according to user information maintained in or in association with such user profiles and accounts.

In some inventive embodiments described herein, a first entity and/or enterprise entity herein provides financial services and operates as a financial institution. The first entity may be previously and currently engaging a user in a range of services such as checking, credit card, debit card, mortgage, and savings account services. In such cases, where the user is a highly engaged client, the service entity has direct access to data regarding credit cards, checking, savings, and other financial arrangements and means. In such examples and others, the first entity maintains account records, each associated with a respective one of multiple user entities, for example as represented in FIG. 1 as data 234, which can include, as non-limiting examples, cached data, and files such as those for user accounts, user profiles, account balances, and transaction histories.

For security and confidentiality purposes, account records are generally secured from unauthorized access. Thus, the account records of a particular user are inaccessible without user authentication. However, even prior to or without such authentication, an agent or system of the first entity may conduct a communication session and provide information, for example, about multiple services made available at least in part by the first entity. In examples of the first entity and/or enterprise entity providing financial services and/or operating as a financial institution, the services made available and for which information can be disseminated prior to or without user authentication can include, as non-limiting examples, policies and offerings for checking, credit card, debit card, mortgage, and savings account services, and the information disseminated can be provided without specific user account details in the absence of user authentication.

The account records of a particular user, in some examples, are made accessible to the user during a bidirectional communication session upon user authentication by the user. For example, a username and password implemented as a security code may be provided to satisfy user authentication and/or further security measures may be applied. Upon user authentication, user access to accounts and actions may be permitted such as balance requests, funds transfers, funds conversions, and other information access and action regarding user owned or user associated assets.

Figure 5:
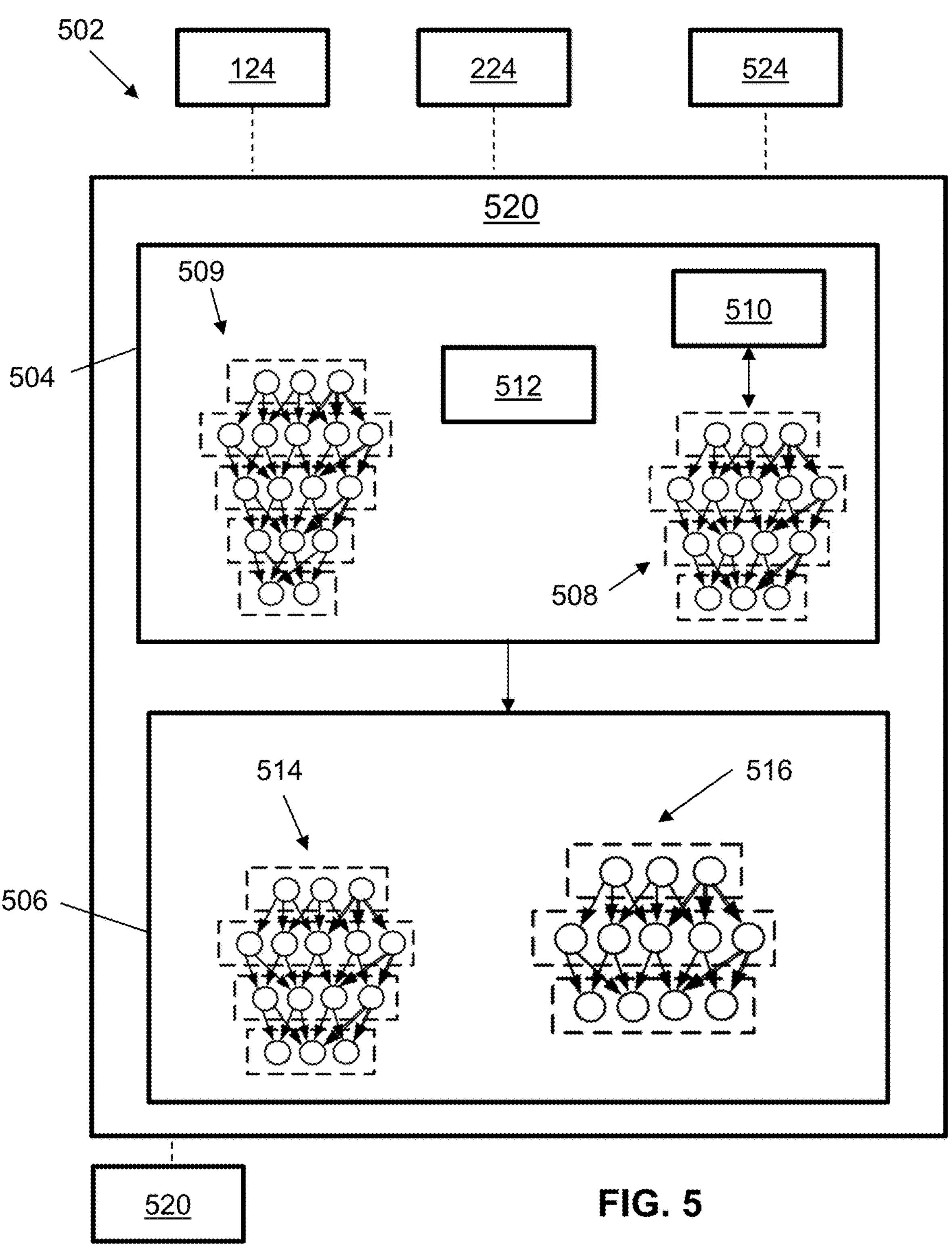
FIG. 5 is a schematic logic diagram of an artificial intelligence program including a front-end and a back-end algorithm.
Figure 6:
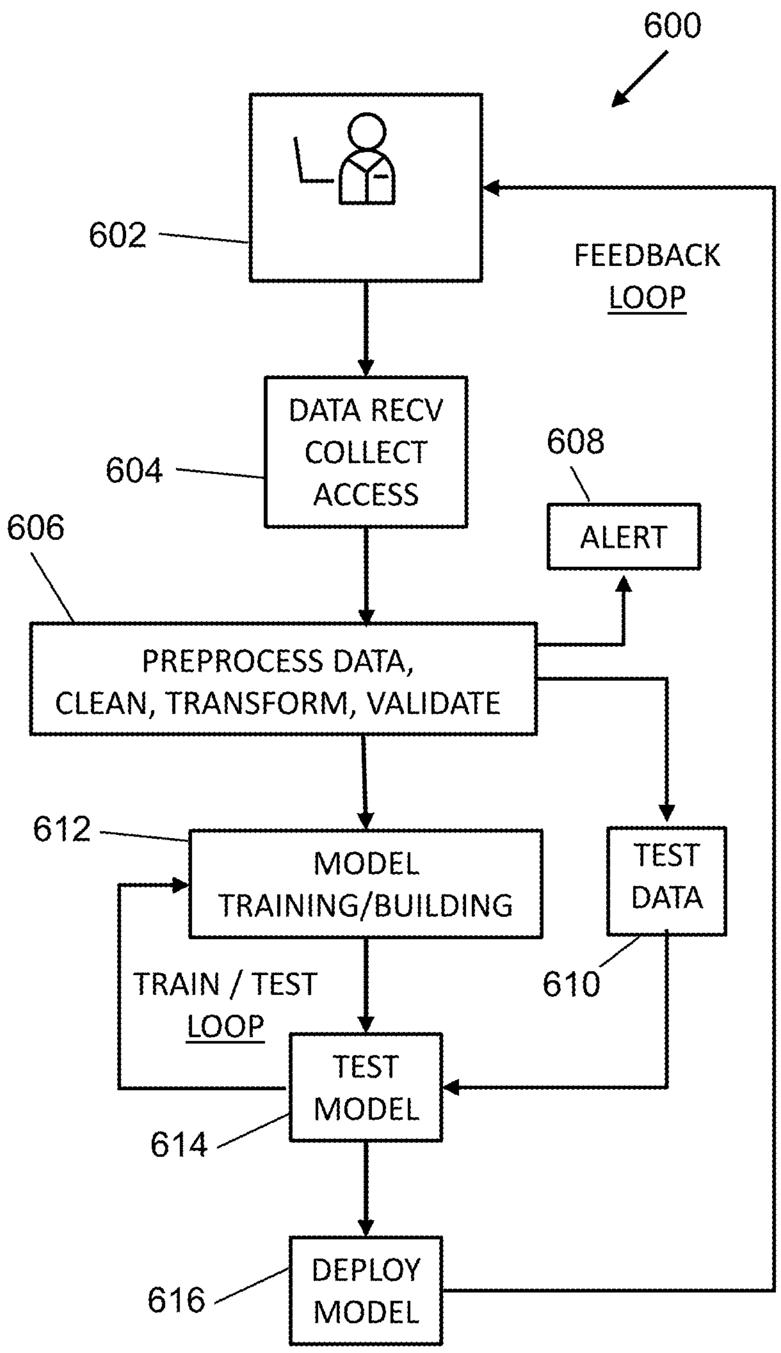
FIG. 6 is a flow chart representing a machine-learning technique or method, according to at least one embodiment, for model development and deployment by machine learning.
Figure 7:
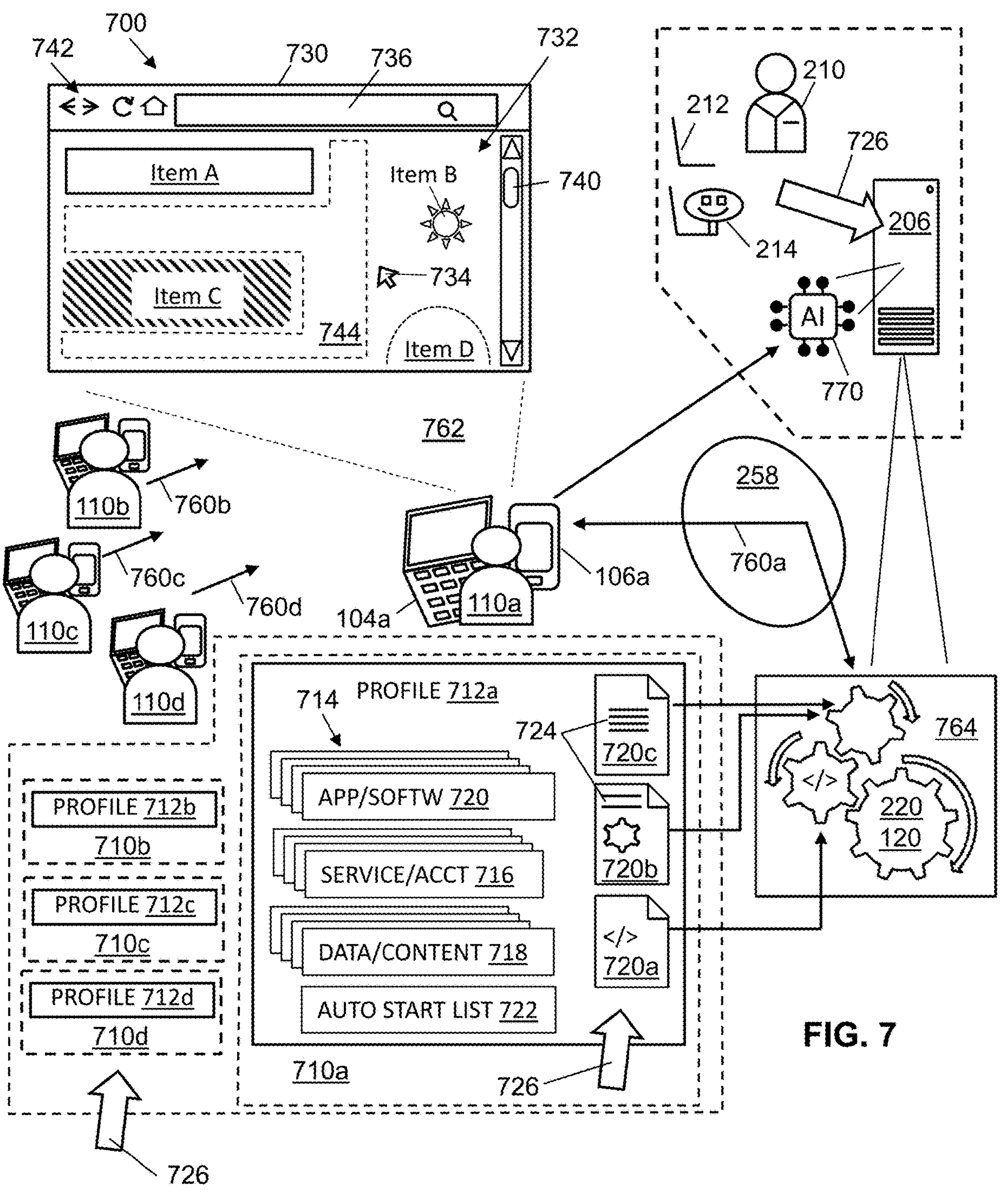
FIG. 7 represents the system of FIG. 1 in abbreviated illustration to exemplify a system for automating user-specific performance customization in software controlled across multiple devices.
Figure 8:
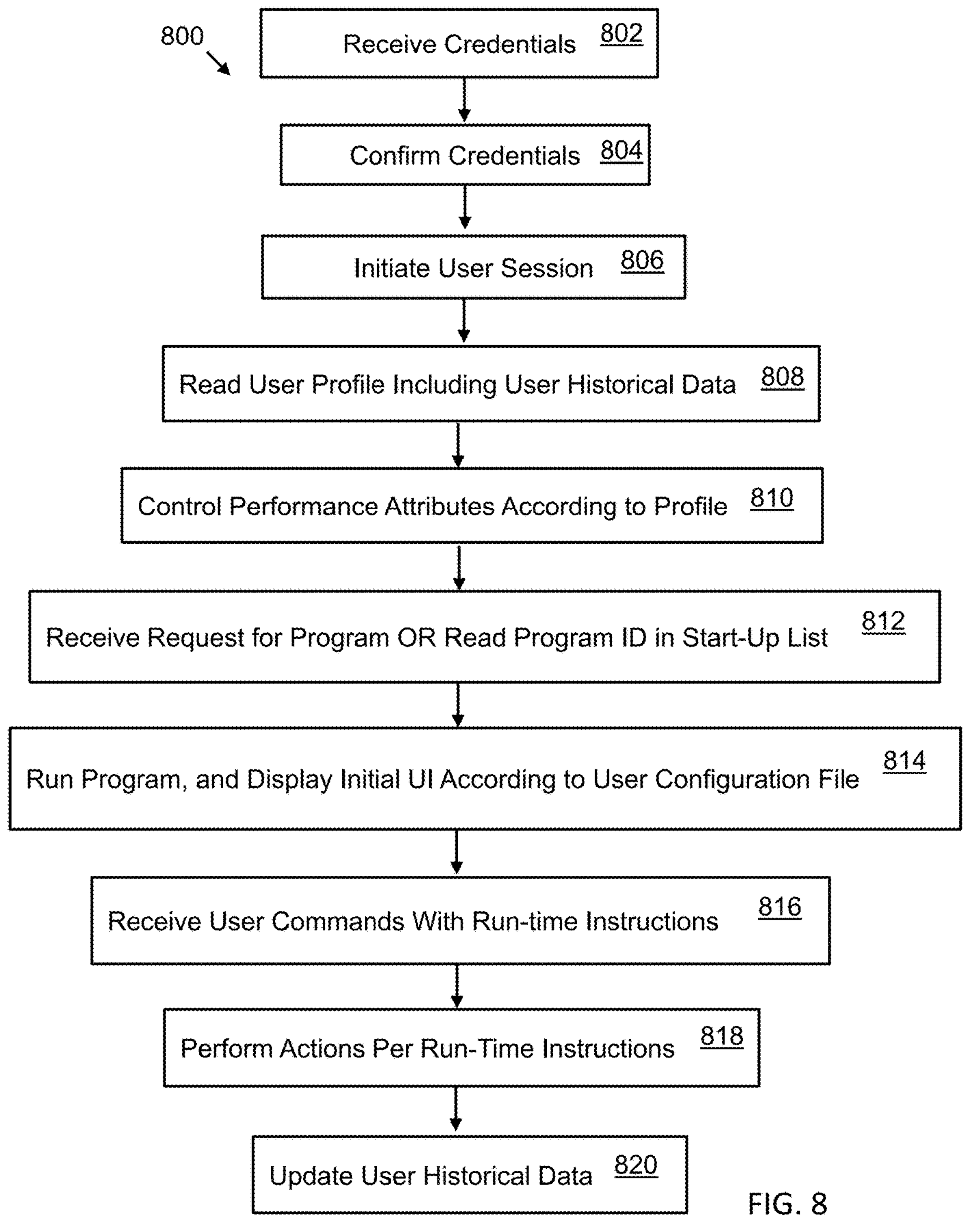
FIG. 8 is a flow chart representing a method for automating user-specific performance customization in software controlled across multiple devices as implemented for example in FIG. 7.

Before proceeding with further descriptions of the inventive user-specific performance customization according to FIGS. 7-8, in some embodiments of which artificial intelligence (AI) is deployed, these description turn now to FIG. 2A through FIG. 6. As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between-1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
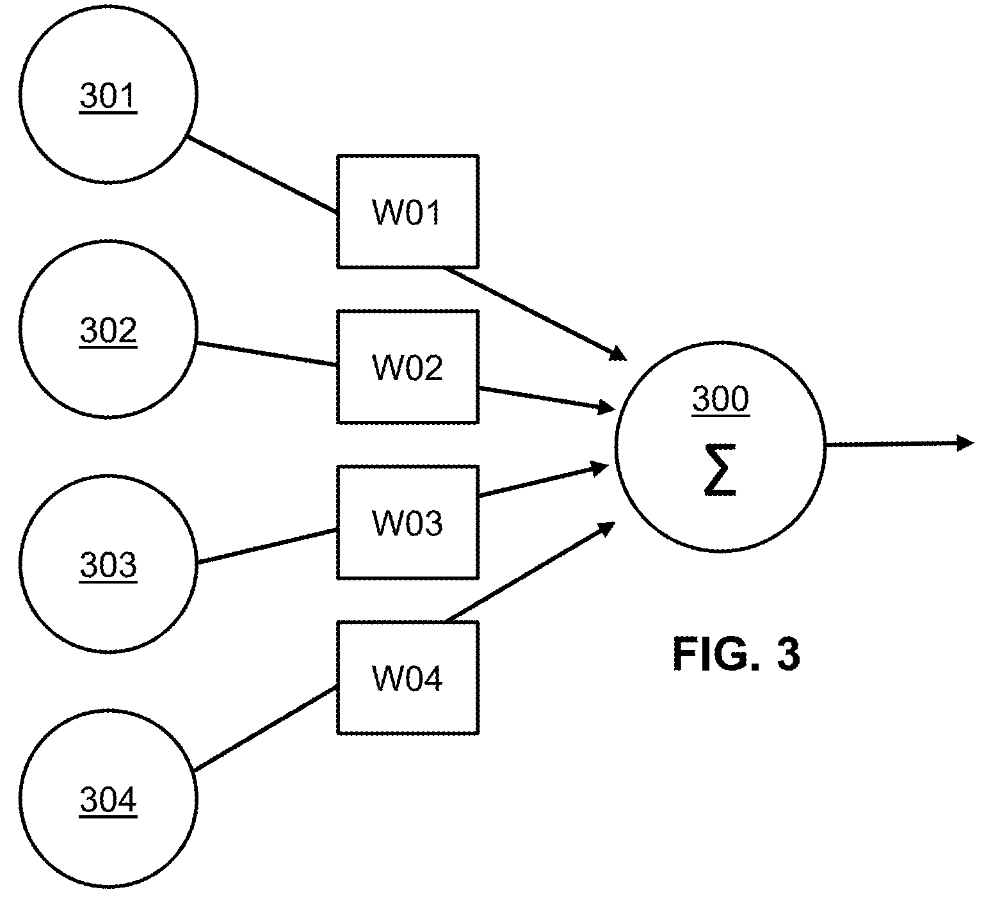
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
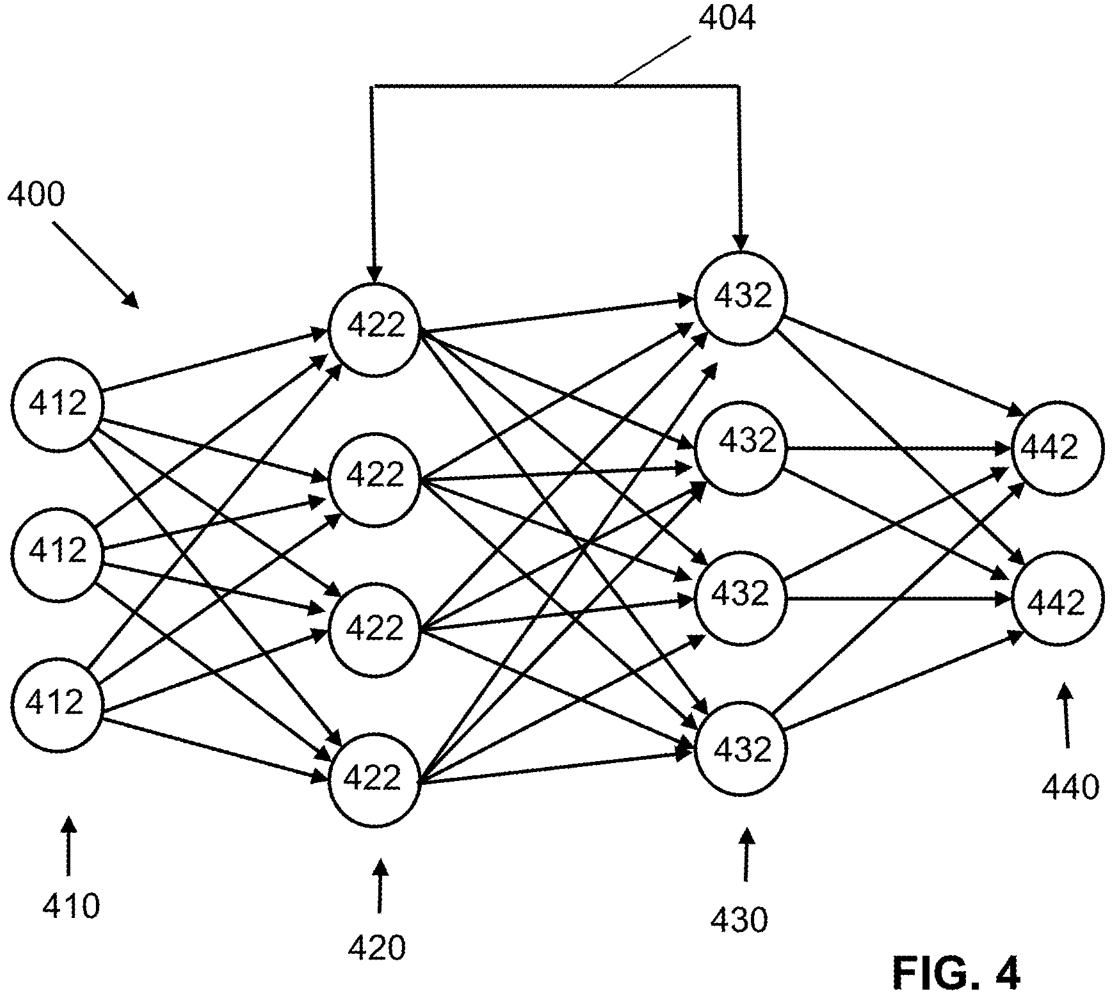
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes).

Additionally or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end algorithm 504 configured to perform pre-processing, such as feature recognition, and a back-end algorithm 506 configured to perform an operation on the data set communicated directly or indirectly to the back-end algorithm 506 that together form the deep neural network). For instance, the front-end algorithm 504 can include at least one CNN 508 communicatively coupled to send output data to the back-end algorithm 506.

Additionally or alternatively, the front-end algorithm 504 can include one or more AI algorithms 510, 512 (e.g., statistical models or machine learning programs such as decision tree learning, associate rule learning, recurrent artificial neural networks, support vector machines, and the like). In various embodiments, the front-end algorithm 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end algorithm 504, an output from an AI algorithm 510 may be communicated to a CNN 508 or 509, which processes the data before communicating an output from the CNN 508, 509 and/or the front-end algorithm 504 to the back-end algorithm 506. In various embodiments, the back-end algorithm 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end algorithm 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 522 (e.g., hardware). The machine learning framework may include an index of basic operations, subroutines, and the like (primitives) typically implemented by AI and/or machine learning algorithms. Thus, the AI program 502 may be configured to utilize the primitives of the framework 522 to perform some or all of the calculations required by the AI program 502. Primitives suitable for inclusion in the machine learning framework 522 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a machine-learning technique or method 600, according to at least one embodiment, for model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop. Such feedback may flow through a user, or in various embodiments, the method automatically provides feedback, retrains and redeploys the retrained model.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations. During each iteration of the training and testing loop, the accuracy of the model may be evaluated. In one embodiment, the re-evaluation of the model can include comparing an output of the model with an actual target result or variable to determine the accuracy of the prediction. If the model is not satisfying a minimum threshold level of accuracy (i.e., the model is underfitted), the system may automatically determine that the threshold level of accuracy is not satisfied and may adjust the weights for a subsequent iteration of the training and testing loop. The weights may be iteratively adjusted during each iteration of the training and testing loop based on the comparison to the threshold level of accuracy. However, there is a balance for training the model in order to avoid overfitting when the model would not perform well on predictions of new data. Rather, the model is automatically trained to be well-fitted such that it satisfies a threshold level of accuracy without learning the noise in the data to the extent that the model would not apply to new data by preventing additional iterations of the training and testing once a maximum accuracy threshold value has been obtained. Thus, with each iteration of the training and testing loop, the accuracy of the model is improved and the iterative training and testing of the model provides an improvement to the performance of a computer and computing technology because the system may automatically determine how many iterations to perform so that the model is well-fitted by surpassing the minimum threshold level of accuracy while automatically stopping the iterative training and testing of the model before the maximum accuracy threshold is obtained. In some embodiments, the training and testing loop utilizes a backpropagation algorithm and a gradient descent algorithm. Gradient descent is an optimization algorithm used to minimize differentiable real-valued multivariate functions. Gradient descent is an optimization algorithm used to minimize differentiable real-valued multivariate functions. The gradient descent algorithm may be used to iteratively adjust model parameters using calculated derivatives to minimize a loss function. Backpropagation may be used to calculate the gradient of the error function with respect to the neural network's weights.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

As discussed above, oversight of a deployed machine learning model may be automatically performed via a feedback loop whereby the method assesses performance of the deployed model (see step 616) and the feedback loop automatically provides feedback for further training of the machine learning model to improve its performance, and upon completion of the other method steps such as 612, the machine learning model that has been automatically retrained based on the feedback loop is then redeployed (step 614). In some embodiments, the system is continually receiving training data as new predictions are made and more data is collected. The continuous training data may be discretized to generate input data to retrain the model. Discretization methods can convert continuous data to discrete data by binning, clustering, and numerical discretization. The model may monitor incoming data sets to make predictions. When predictions are made the system analyzes the predictions to determine whether the model needs to be retrained.

Advantageous systems and methods within the scope of the above descriptions of FIG. 1 and the below descriptions of FIGS. 7-8 serve to vary the tasks and performances of programs and users by automating user-specific performance customization in software controlled across multiple devices, in some embodiments employing artificial intelligence as described in FIG. 2A-6.

A commercial application can have many functionalities to perform client tasks and meet needs for daily business. For example, payment systems of various types, reporting systems, statements, and/or payment templates can fulfill client business needs. Corresponding functionalities can be configured based on user roles and responsibilities. In some embodiment of inventive systems, devices, and methods described herein, users can see the functionalities assigned to them so as to enable their performing those functionalities based on their role. This can be controlled by a user or an administrator based on a role.

In some embodiments, limitations are applied to user profiles. For example, a user may have only a single default profile, not one per role for example. Specific roles can be created, one for each combination of roles assigned a user. In at least one implementation, combined profiles are created by first creating a number of small role-specific profiles. These can be subsequently merged to form a combined profile.

Examples of ways to implement configuration base client customization, including as non-limiting and non-exhaustive examples, file-based configuration and data-driven configuration.

For a file-based configuration, developers create one or more configuration files base on the role or profile that controls the behavior of an application. The configuration files can be stored in a variety of formats, such as XML, YAML, and JSON, as non-limiting and non-exhaustive examples.

For a data-driven configuration, configuration details can be stored in a database table and be pulled from the table when a user logs in to a system based on that user's details.

Application code designed to read and interpret the configuration information determines a user application's behavior at run-time. The allows developers to make changes to an application's behavior simply by modifying the configuration files or configuration data through separate tools, such as admin applications, rather than modifying the code of the user application.

To assure the success of configuration-based client customization, the following practices can be implemented in systems and methods according to these descriptions. Configurations can be kept separate from application code to better facilitate their management and maintenance. A use version control tool, of which Git is a non-limiting example, can be used to track changes to configuration files similarly as can be done with respect to application code. Before deploying configuration changes to production, testing can be applied thoroughly to ensure intended working order.

A configuration management tool can be used to manage configuration files. Configuration based client customization can include faster development. By separating configuration files from code, changes can be made to application behavior without modifying code or redeploying an application. This can greatly increase the speed of development processes, making possible quick testing and the release of new features.

Configuration based client customization can facilitate easy maintenance. Configuration files are typically easier to maintain that code, as they are typically simpler and less complex. Thus developers can more easily troubleshoot issues and make changes to application behavior.

Configuration based client customization provides heightened flexibility. Configuration-driven architecture allows developers to make changes to an application's behavior without having to modify code. This makes is easier to adjust an application's behavior to meet changing business needs.

Configuration based client customization lowers risks. When developers make changes to an application's code, there is a risk of introducing bugs or other issues. By separating configuration from code, developers can make changes with less risk of causing unintended consequences.

Configuration based client customization according to embodiments described and implied herein provides a powerful approach to meeting various expectations toward fulfilling daily business needs. The configuration approach helps software deploy faster with less risk. By separating configuration from code, developers can make changes to application behavior without having to modify code, making it possible to quickly test and release new features.

According to some embodiments of the above-described devices and systems, as further exemplified in FIG. 7, an advantageous system for securely customizing user-specific run-time performance in software controlled across multiple devices is provided and implements a corresponding method, as represented in flow-chart form in FIG. 7. The multiple illustrated user devices among the users (110_a_, 110_b_, 110_c_, 110_d_) shown in FIG. 7, of which devices 104_a_ and 106_a_ serve for brevity as singly described examples of others also illustrated, may be utilized by workers of a providing entity, customers a providing entity, clients of a providing entity, and/or workers of a business that is a client of a providing entity.

Advantageously, programs, applications, and other software used by multiple such users can have underlying generalities across the user devices, while user-specific customization is nonetheless implemented. Core code for programs can be stored separate from various user-specific files that customize user experiences at run-time. The running performances of specific programs are adjustable and/or customizable by modification of associated configuring files without modifying the code. Conversely, common updates can be made to underlying code across many devices without denying each user their preferences and without requiring users to spend time re-establishing their preferred settings and arrangements.

The system 200 is represented in abbreviated illustration in FIG. 7 for convenience to exemplify a system for securely customizing user-specific run-time performance in software controlled across multiple devices. The system 200 accordingly, with respect to such embodiments descriptions of which herein in instances refer to elements of the drawings by reference numbers without limiting those descriptions to depicted elements, includes or constitutes a computing system 206 of a first entity including one or more processor 220 configured to execute computer-readable instructions 226 (FIG. 1), at least one of a memory device and a non-transitory storage device (222, 224 FIG. 1), and a communication interface 250 for operatively connecting, via a communication network 258, the one or more processor to one or more user device.

Multiple users (110_a_, 110_b_, 110_c_, 110_d_) are illustrated in FIG. 7, representing examples each according to descriptions above with reference to the user 110 in FIG. 1. In the following, user actions, experiences, and user devices are once described with reference to the user 110_a_ for brevity without express repetition with respect to users 110_b_, 110_c_, and 110_d_. These descriptions nonetheless refer to any number of users, their devices, the actions, and their experiences. The user 110_a_ utilizes one or more user device, referring to either or both of the computing device 104_a_ and the mobile device 106_a_.

The computing system 206 maintains and stores multiple data sets 710_a_, 710_b_, 710_c_, and 710_d_ in association respectively with the users 110_a_, 110_b_, 110_c_, and 110_d_. Each user-specific data set 710_a_, 710_b_, 710_c_, and 710_d_ includes a respective user-specific profile 712_a_, 712_b_, 712_c_, and 712_d_, for which the user-specific profile 712_a_ associated with the user 110_a_ serves as an example in these descriptions.

The representative profile 712_a_ documents and/or stores records 714 representing applications, programs, and other software, records 716 representing services and accounts, and records 718 representing other data and digital content. Records 714 representing applications, programs, and other software available to the specific user 110_a_ as exemplified by the application 720, can include code and executable files 720_a_, configuration files 720_b_ associated with the respective files 720_a_, and/or other configuring files 720_c_ also associated respectively with the files 720_a_.

The records 718 representing other data and digital content include, according to advantageous embodiments described here, user-specific historical data stored over time from multiple prior user sessions of the specific user. Upon receiving user requests, for example to access and run programs, and upon receiving user commands, The user-specific historical data is updated. Updates can be done in-session, periodically, and/or at the end of a session. For example, runtime instructions for a specific program can be entered, abbreviated, or otherwise represented by data updated to the user-specific historical data. Performance attributes of any current user session can be controlled according at least in part to the user-specific historical data. For example, any programs typically requested and run by a particular user may be added to the start-up list 722 described below. The user-specific historical data may be used by a controlling algorithm trained by a machine-learning technique, for example to predict user commands based on ingested historical data stored over time and using a trained model based on weighted calculations.

The configuration files, represented by files 720_b_, in some embodiments, are files used to configure the parameters and initial settings, each for particular programs or applications represented by the code and/or executable files 720_a_. Such configuration files are typically termed config files. Programs and applications typically have their configuration files read at least at startup. In some cases, users and/or administrators and/or programs can prompt the reading the configuration files while running and apply changes to a current process.

The configuring files, with reference to both the configuration files 720_b_ and other configuring files 720_c_, in some embodiments contain user-specific performance instructions for at least in part controlling behavior of specific programs represented by the code and/or executable files 720_a_. As with the configuration files 720_b_, programs and applications can have the files 720_c_ read at startup and while running beyond startup. In some cases, users and/or administrators can have some programs to again read the files 720_c_ while running and apply changes to a current process. In some cases the files 720_c_ may serve similarly or the same as config files. The user-specific files 720*c* may include, as non-limiting examples, a database and/or a table.

In the illustrated example, the user-specific profile 712*a* comprises a start-up list 722 that includes an identification of each of one or more program or application for automatic opening upon initiating a user session. When reading the user-specific profile associated with received login credentials upon a user attempting to log in, the computing system 206 reads each identification in the start-up list 722, and accordingly automatically opens each identified application upon opening a user session. The start-up list need not be implemented as a separate single consolidated file. Whether an application is to start automatically may be indicated in other stored files or contents, including, for example, configuration files 720*b*, other files 720*c*, and other profile contents, thus defining a start-up list whether that is defined as data in a single file or as data distributed and indexed elsewhere. The application list can be similarly defined and/or implemented.

FIG. 7 graphically represents a computer processing event or session 264 as at least one processor, referenced as a processing device 220 of the computing system 206, conducting, at least in part, a user session 762. FIG. 7 illustrates that the processing device 220 executes the code 720*a* as computer-readable instructions and performs functions at least in part according to and/or affected by the associated configuration file 720*b* and/or file 720*c* as described above. FIG. 7 additionally similarly references a processing device 120 of a user device (104*a*, 106*a*) to convey that the user session 762, in some embodiments, is conducted by cooperation of the computing powers of the computing system 206 and the user device, each having one or more processor executing computer-readable instructions under partial control or affect according to associated configuration files and or other files at least in part controlling behavior of their associated specific programs.

The current user session 762 conducted via the specific user device (104*a*, 106*a*) is expected to be conducted concurrently with multiple other user sessions for other users via other respective user devices. Each such session can differ according to user navigation, tasks, and user-specific preferred settings and arrangements.

In the example of FIG. 7, the code 720*a* is stored separate from each of the configuration file 720*b* and file 720*c*. Thus, the running performance of the specific program is adjustable and/or customizable by modification of the user-specific configuration file 720*b* and/or user-specific file 720*c* without modifying the code. In the multi-user environment of FIG. 7, the represented users and their devices can be of any number, and may be remotely and separately located relative to central resources such as the computing system 206. The separate storage of the code 720*a* from user-specific program-specific configuration files 720*b* and/or files 720*c*, stored at least as separate files though they may be stored together on a common storage medium, permits the customization of user-specific performance customization in software, represented at least in part by the code 720*a*, controlled across multiple devices use by multiple respective users. Updates and modification can be made separately to the code 720*a*, to the user-specific program-specific configuration files 720*b*, and to the files 720*c*. This advantageously facilitates adaptable content to be distributed and implemented across various platforms such as websites and widely used applications. Common updates can be made to underlying code 720*a* across many devices without disrupting the use experience of each user or necessitating they re-establish their experience preferences such as preferred layout and other display arrangement settings, which are stored or embedded in the user-specific configuration files 720*b* and/or files 720*c*. In FIG. 7, a system-wide update 726 is pushed by either or both of a human agent 210 and a virtual agent 214.

The update 726 in at least one embodiment represents an update to the configuring files of one or more program, without modifying the code thereof. Administrators over work groups or other user groups, for example, can deploy such an update to streamline user experiences for example across a customer base or remote work force.

The update 726 in one or more other embodiment represents a program code update, affecting the code, representing singly by the code and/or executable files 720*a*, within or associated with the multiple data sets of the users (110*a*, 110*b*, 110*c*, 110*d*), without modification in some embodiments to the associated configuring files, with reference to both the configuration files 720*b* and other configuring files 720*c*.

FIG. 7 illustrates the computing system 200, according to at least one embodiment, engaged in a user session 762 in which the user 110*a* utilizes a particular application or program 720. FIG. 8 represents a method implemented thereby in flow-chart form as a non-limiting number of representative and non-exhaustive steps corresponding at least to functions in FIG. 7. For each user device of the multiple user devices among the users (110*a*, 110*b*, 110*c*, 110*d*), and as represented by step 802 of the method 800 (FIG. 8), the computing system 206 (FIG. 7) can receive, via the network 258, login credentials from a specific user device of the multiple user devices, as represented by communications 760 across the network 258 representing signals and other content sent and received by a user device (104*a*, 106*a*) and signals and other content sent and received by the computing system 206.

Upon receipt of the login credentials, as represented by step 804 of the method 800 (FIG. 8), the system 206 confirms validity of the login credentials with respect to a specific user. For example, the system 206 may read at least a portion of the user-specific profile 712*a* associated with login credentials and determine confirmation of the login credentials. Upon confirmation, the computing system initiates and conducts a current user session 762 via the specific user device (104*a*, 106*a*), as represented by step 806 of the method 800 (FIG. 8).

The computing system reads the user-specific profile 712*a* upon or as a component of initiating the user session, as represented by step 808 in FIG. 8. Performance attributes of the current user session are controlled at least in part according to the user-specific historical data, as represented by step 810 of the method 800 (FIG. 8). Controlling the performance attributes of the current user session can include automatically establishing a display arrangement, automatically sizing a window, automatically positioning a window, and automatically displaying a background image in a window.

As represented by step 812 in FIG. 8, the computing system may receive a user request from the specific user device, the request specifying a specific program to be run. Upon receipt of the user request, represented by communications 760*a*, which also represents other signals and content conveyed across the network 258, and insofar as such a requested program is available to the user 110*a* according to the application list 714, the computing system opens the program. Alternatively, if the particular program is included in the start-up list 722, then upon initiating the user session 762, the computing system 206 reads the identification of the program in the start-up list 722 and accordingly automatically opens the specific program.

FIG. 7 graphically represents the user session 762 as including at least a user-navigation event, such as the running of a particular program 720. In some embodiments, opening the program 720 entails reading at least one configuring file, with reference for example to either and both of the associated configuration file 720*b* and/or other configuring file 720*c* as described above, the at least one configuring file containing user-specific performance instructions 724 for at least in part controlling behavior of the specific program. The computing system authorizes running of the specific program thereby causing displaying, by the specific user device, a user interface of the specific program at least in part controlled by the user-specific performance instructions 724 in the at least one configuring file, as represented by step 812 in FIG. 8.

In the current user session 762, the computing system 206, for example in cooperation with the specific user device, runs the particular program 720, by execution of at least the corresponding code 720*a* as affected by the configuration file 720*b* and/or other configuring file 720*c*, and thereby causes, via the network connection 258, displaying by the specific user device (104 a, 106*a*) items in a display arrangement in a user interface 730, the display arrangement specified at least in part in a configuration file 720*b* in the user-specific profile 710*a*.

In the example of FIG. 7, the user-specific performance instructions 724 at least in part control the behavior of the program 720 by specifying and/or configuring, at least in part, a display arrangement 732 thereof, provided as a non-limiting example and shown as the layout of contents of an application page or navigation window 700. During the user session 762, the user 110*a*, via what user device (104*a*, 106*a*) is in use, utilizes the program 720 by directing actions and functions. Run-time instructions of the user 110*a* are conveyed as user commands, at least some of which are sent from the user device to the computing system 206 across the network 258. The computing system, as represented by step 816 of the method 800 (FIG. 8), receives user commands across the network 258 from the particular user device, the user commands including the run-time instructions for the particular program. As represented by step 818 of the method 800 (FIG. 8), the computing system performs actions, via the particular program 720, corresponding to the run-time instructions and according to the user-specific performance instructions.

User inputs such as the run-time instructions and other commands from the user are provided at the user device as inputs, which are enabled for example via various input devices of the user device (104*a*, 106*a*) as described above with reference to FIG. 1. In FIG. 7, user input and/or commands can be made in part by control of a cursor 734, which may be controlled by the user via mouse, a finger touch position, and a stylus position in various examples. Content items referenced in FIG. 7 as Item A, Content Item B, Item C, and Item D are each available for selection, use, and manipulation by the user 110*a*. The display arrangement further refers to appearances and locations of icons and navigation tools such as an address bar 736, and a scroll tool 740, which are also content items available for selection, use, and manipulation. The navigation tools 742 (back, forward, reload, home) near the address bar are available for selection, use, and manipulation. The use of these by the user 110*a* represents user commands in accessing content, and thus by tracking user interactions with such content items, user preferences and use patterns may be determined. The efficacy and efficiency of user tasks during any given user session may be optimized by user-preferred items and their arrangement.

The computing system 206 may receive run-time instructions across the network 258 from the specific user device (104*a*, 106*a*) including instructions to modify the display arrangement 732, in response to which the computing system 206, for example in cooperation with the user device, modifies the configuration file according at least to the instructions to modify the display arrangement.

The run-time instructions in some embodiments include instructions to modify the display arrangement and may include any and all of instructions to resize a window, instructions to reposition a window, instructions to select a background image 744 in a window, and instructions to adjust a background image in a window. Background image 744 is broadly intended to represent user-preferred or preset pictures, colors, and or patterns.

The run-time instructions in some embodiments include instructions to modify the display arrangement and may include any and all of instructions to set a property on a form, instructions to set or revise whether a form should automatically prepopulate one or more field, instructions to set or revise whether a form should automatically perform a query, instructions to set or revise whether a form should open a query dialog, instructions to set or revise whether a form should create a new record, and instructions to set or revise whether at least one field in a form should start empty when initiated.

As represented by step 820 of the method 800 (FIG. 8), the computing system automatically updates the user-specific historical data in the user-specific profile according to session parameters, such any received user requests, the received user commands, and the run-time instructions for particular programs. Upon initiating a subsequent user session for the specific user, for example with reference to step 806 of the method 800 at an instance subsequent the illustrated user session 762, the session proceeds as already described, affected by the updated user-specific historical data. Accordingly, as the computing system reads (step 808) an updated version of the user-specific profile 712*a*, and performance attributes of the subsequent user session are controlled at least in part according to the updated user-specific historical data, as represented by step 810 of the method 800 (FIG. 8). Updates can be done in-session, periodically, and/or at the end of a session. For example, runtime instructions for a specific program can be entered, abbreviated, or otherwise represented by data updated to the user-specific historical data.

Among changes a user can make according to their preferences, as recorded at least in part in their historical data, users in some embodiments are permitted the authority and functionality to choose what applications are identified in their start-up list, insofar as such a preferred application is available to the user. The computing system 206 may receive a user command, from the specific user device (104*a*, 106*a*) of any given session, to include or add an identification of a specific application in the start-up list. The computing system 206 then automatically determines whether the specific application is identified in the application list 714 in the user-specific profile. Upon determining the specific application is identified in the application list 714 in the user-specific profile 712*a*, the computing system 206 adds the identification of the specific application to the start-up list 722. At least upon initiation of a subsequent user session, the added specific application is automatically accordingly opened.

Controlling performance attributes (step 810) of a user session 762 according at least in part to the user-specific historical data in the records 718 of the user-specific profile 712A, in some embodiments, includes using a controlling algorithm 270 trained by a machine-learning technique, for example represented in at least one embodiment by the method 600 of FIG. 6. The computing system trains the controlling algorithm 270 by ingesting user-specific historical data stored over time from multiple prior user sessions of each of multiple users (110*a*, 110*b*, 110*c*, 110*d*). In at least one iteration of multiple iterations, as represented at least by the train/test loop in FIG. 6, subsequent user commands of at least some users of the multiple users are predicted based on the ingested historical data stored over time using a trained model based on weighted calculations. Actual subsequent user commands from at least some users via respective user devices are received across the network connection 258, represented as at least part of communications 760*a*, 760*b*, 760*c*, and 760*d* in FIG. 7. Comparison data is aggregated by comparing respectively the predicted subsequent user commands of the at least some users to the actual subsequent user commands from the at least some users. Using the aggregated comparison data, weights of the weighted calculation are updated for use in one or more other following iterations, in which further user commands of at least some users of the multiple users are predicted and further comparisons made until the weights of the weight calculation evolve to provide satisfactory predictions, for example according to a threshold.

The above-described systems and methods, in which the separate storage of the code 720*a* from user-specific program-specific configuration files 720*b* and/or other configuring files 720*c*, are novel and advantageous. The above-described systems and methods are distinguished over what can be feasibly accomplished by, for example, manual action by system administrators assisting users, or each user acting themselves, in re-establishing preferred user-session settings and application display arrangements after broad updates are made to code. As any given user session is initiated and conducted, the computing system concurrently conducts multiple other user sessions via other respective user devices. In modern computing environments, which effectively include distributed work forces and customer bases, only modern processors can feasibly handle the data flow of the above-described activities when dozens of user sessions, hundreds of user sessions, thousands of user sessions, and even tens of thousands of user sessions and beyond are conducted concurrently.

By relieving users from repeating their actions in modifying user-experience settings, such as display arrangements in user interfaces, the efficiency of communications (760*a*, 760*b*, 760*c*, 760*c*) between users and content providers is improved, for example, by minimizing navigational steps to the respective content each user prefers or frequents and display arrangement steps in configuring user interfaces to suit respective user preferences. This conserves network resources, improves communication networks and systems efficiencies, reduces costs, and lowers energy consumption. Data traffic on network connections is reduced, improving network efficiencies, and reducing latencies and operating costs.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A system for automating user-specific performance customization in software controlled across multiple devices, the system comprising:

a computing system comprising at least one processor and at least one of a memory device and a non-transitory storage device, wherein said at least one processor executes computer-readable instructions stored at least in part by the at least one of a memory device and a non-transitory storage device; and a network connection for operatively connecting multiple user devices to the computing system, wherein, upon execution of the computer-readable instructions, the computing system is configured to perform steps comprising, for each user device of the multiple user devices:

receiving login credentials from a specific user device of the multiple user devices;

confirming validity of the login credentials with respect to a specific user;

initiating and conducting a current user session via the specific user device, the current user session comprising the computing system:

reading a user-specific profile associated with the received login credentials and the specific user, the user-specific profile comprising:

a user-specific program list identifying one or more programs available to the specific user;

for each program of the one or more programs identified in the user-specific program list, a user-specific program-specific configuration file; and user-specific historical data stored over time from multiple prior user sessions of the specific user, controlling performance attributes of the current user session according at least in part to the user-specific historical data;

at least one of reading an automatic start-up list comprising an identification of a specific program, and receiving a user request from the specific user device, the user request comprising a request to run the specific program;

authorizing running of the specific program thereby causing across the network connection displaying, by the specific user device, a user interface of the specific program at least in part controlled by the user-specific program-specific configuration file for the specific program, wherein the running of the specific program comprises executing code for the specific program, and wherein the running of the specific program is adjustable by modification of the user-specific program-specific configuration file for the specific program without modifying the code for the specific program;

receiving user commands across the network connection from the specific user device, the user commands comprising runtime instructions for the specific program;

performing actions, via the specific program, corresponding to the runtime instructions;

automatically updating the user-specific historical data in the user-specific profile according to at least one of: the received user request; and the received user commands; and upon initiating a subsequent user session of the specific user, controlling performance attributes of the subsequent user session according at least in part to the updated user-specific historical data in the user-specific profile.

2. The system according to claim 1, wherein controlling performance attributes of the current user session according at least in part to the user-specific historical data comprises at least one of automatically establishing a display arrangement, automatically sizing a window, automatically positioning a window, and automatically displaying a background image in a window.

3. The system according to claim 1, wherein controlling performance attributes of the current user session according at least in part to the user-specific historical data comprises automatically setting a property on a form, automatically prepopulating at least one field, automatically setting whether a form should automatically perform a query, automatically setting whether a form should open a query dialog, automatically setting whether a form should create a new record, and automatically setting or revising whether at least one field in a form should start empty when initiated.

4. The system according to claim 1, wherein the code for the specific program is stored separate from the user-specific program-specific configuration file for the specific program.

5. The system according to claim 1, wherein the computing system, upon initiating and conducting the current user session via the specific user device, concurrently conducts multiple other user sessions for other users via other respective user devices.

6. The system according to claim 1, wherein controlling performance attributes of the current user session according at least in part to the user-specific historical data comprises using a controlling algorithm trained by a machine-learning technique.

7. The system according to claim 6, wherein the computing system further trains the controlling algorithm by the machine-learning technique, and the machine-leaning technique comprises:

ingesting user-specific historical data stored over time from multiple prior user sessions of each of multiple users; and in at least one iteration of multiple iterations:

predicting subsequent user commands of at least some users of the multiple users based on the ingested historical data stored over time using a trained model based on weighted calculations;

receiving across the network connection actual subsequent user commands from the at least some users via respective user devices;

aggregating comparison data by comparing respectively the predicted subsequent user commands of the at least some users to the actual subsequent user commands from the at least some users; and updating, using the aggregated comparison data, weights of the weighted calculation for use in one or more other iterations following the at least one iteration, in which further user commands of at least some users of the multiple users are predicted.

8. A system for automating user-specific performance customization in software controlled across multiple devices, the system comprising:

a computing system comprising at least one processor and at least one of a memory device and a non-transitory storage device, wherein said at least one processor executes computer-readable instructions at least in part stored by the at least one of a memory device and a non-transitory storage device; and a network connection for operatively connecting multiple mobile user devices to the computing system, wherein, upon execution of the computer-readable instructions, the computing system is configured to perform steps comprising, for each mobile user device of the multiple mobile user devices:

receiving login credentials from a specific mobile user device of the multiple mobile user devices;

confirming validity of the login credentials with respect to a specific user;

initiating and conducting a current user session via the specific mobile user device, while concurrently conducting multiple other user sessions for other users via other respective mobile user devices, the current user session comprising the computing system:

reading a user-specific profile associated with the received login credentials and the specific user, the user-specific profile comprising:

a user-specific program list identifying one or more programs available to the specific user;

for each program of the one or more programs identified in the user-specific program list, a user-specific program-specific configuration file; and user-specific historical data stored over time from multiple prior user sessions of the specific user, controlling performance attributes of the current user session according at least in part to the user-specific historical data using a controlling algorithm trained by a machine-learning technique;

at least one of reading an automatic start-up list comprising an identification of a specific program, and receiving a user request from the specific mobile user device, the user request comprising a request to run the specific program;

authorizing running of the specific program thereby causing across the network connection displaying, by the specific mobile user device, a user interface of the specific program at least in part controlled by the user-specific program-specific configuration file for the specific program, wherein the running of the specific program comprises executing code for the specific program, and wherein the running of the specific program is adjustable by modification of the user-specific program-specific configuration file for the specific program without modifying the code for the specific program;

receiving user commands across the network connection from the specific mobile user device, the user commands comprising runtime instructions for the specific program;

performing actions, via the specific program, corresponding to the runtime instructions;

automatically updating the user-specific historical data in the user-specific profile according to at least one of: the received user request; and the received user commands; and upon initiating a subsequent user session of the specific user, controlling performance attributes of the subsequent user session according at least in part to the updated user-specific historical data in the user-specific profile.

9. The system according to claim 8, wherein controlling performance attributes of the current user session according at least in part to the user-specific historical data comprises at least one of automatically establishing a display arrangement, automatically sizing a window, automatically positioning a window, and automatically displaying a background image in a window.

10. The system according to claim 8, wherein controlling performance attributes of the current user session according at least in part to the user-specific historical data comprises automatically setting a property on a form, automatically prepopulating at least one field, automatically setting whether a form should automatically perform a query, automatically setting whether a form should open a query dialog, automatically setting whether a form should create a new record, and automatically setting or revising whether at least one field in a form should start empty when initiated.

11. The system according to claim 8, wherein:

the code for the specific program is stored separate from the user-specific program-specific configuration file for the specific program; and performance of the specific program is adjustable by modification of the user-specific program-specific configuration file for the specific program without modifying the code for the specific program.

12. A computer-implemented method for a computing system to securely customize user-specific run-time performance in software controlled across multiple devices, the computing system including at least one processor and at least one of a memory device and a non-transitory storage device storing computer-readable instructions, the at least one processor configured to execute the computer-readable instructions, and a network connection for operatively connecting multiple user devices to the computing system, the method comprising, upon execution of the computer-readable instructions, the computing system is configured to perform steps comprising for each user device of the multiple user devices:

receiving login credentials from a specific user device of the multiple user devices;

confirming validity of the login credentials with respect to a specific user;

initiating and conducting a current user session via the specific user device, the current user session comprising the computing system:

reading a user-specific profile associated with the received login credentials and the specific user, the user-specific profile comprising:

a user-specific program list identifying one or more programs available to the specific user;

for each program of the one or more programs identified in the user-specific program list, a user-specific program-specific configuration file; and user-specific historical data stored over time from multiple prior user sessions of the specific user, controlling performance attributes of the current user session according at least in part to the user-specific historical data;

at least one of reading an automatic start-up list comprising an identification of a specific program, and receiving a user request from the specific user device, the user request comprising a request to run the specific program;

authorizing running of the specific program thereby causing across the network connection displaying, by the specific user device, a user interface of the specific program at least in part controlled by the user-specific program-specific configuration file for the specific program, wherein the running of the specific program comprises executing code for the specific program, and wherein the running of the specific program is adjustable by modification of the user-specific program-specific configuration file for the specific program without modifying the code for the specific program;

receiving user commands across the network connection from the specific user device, the user commands comprising runtime instructions for the specific program;

performing actions, via the specific program, corresponding to the runtime instructions;

automatically updating the user-specific historical data in the user-specific profile according to at least one of: the received user request; and the received user commands; and upon initiating a subsequent user session of the specific user, controlling performance attributes of the subsequent user session according at least in part to the updated user-specific historical data in the user-specific profile.

13. The method of claim 12, wherein controlling performance attributes of the current user session according at least in part to the user-specific historical data comprises at least one of automatically establishing a display arrangement, automatically sizing a window, automatically positioning a window, and automatically displaying a background image in a window.

14. The method of claim 13, wherein controlling performance attributes of the current user session according at least in part to the user-specific historical data comprises automatically setting a property on a form, automatically prepopulating at least one field, automatically setting whether a form should automatically perform a query, automatically setting whether a form should open a query dialog, automatically setting whether a form should create a new record, and automatically setting or revising whether at least one field in a form should start empty when initiated.

15. The method of claim 12, wherein the computing system, upon initiating and conducting the current user session via the specific user device, concurrently conducts multiple other user sessions for other users via other respective user devices.

16. The method of claim 12, wherein controlling performance attributes of the current user session according at least in part to the user-specific historical data comprises using a controlling algorithm trained by a machine-learning technique.

17. The method of claim 16, wherein the computing system further trains the controlling algorithm by the machine-learning technique, and the machine-leaning technique comprises:

ingesting user-specific historical data stored over time from multiple prior user sessions of each of multiple users; and in at least one iteration of multiple iterations:

predicting subsequent user commands of at least some users of the multiple users based on the ingested historical data stored over time using a trained model based on weighted calculations;

receiving across the network connection actual subsequent user commands from the at least some users via respective mobile user devices;

aggregating comparison data by comparing respectively the predicted subsequent user commands of the at least some users to the actual subsequent user commands from the at least some users; and updating, using the aggregated comparison data, weights of the weighted calculation for use in one or more other iterations following the at least one iteration, in which one or more other iterations further user commands of at least some users of the multiple users are predicted.

* * * * *